(12) United States Patent
Karmatha et al.

(10) Patent No.: US 11,315,253 B2
(45) Date of Patent: Apr. 26, 2022

(54) COMPUTER VISION SYSTEM AND METHOD

(71) Applicant: Kabushiki Kaisha Toshiba, Minato-ku (JP)

(72) Inventors: Rudra Prasad Poudel Karmatha, Cambridge (GB); Stephan Liwicki, Cambridge (GB); Roberto Cipolla, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 177 days.

(21) Appl. No.: 16/741,804

(22) Filed: Jan. 14, 2020

(65) Prior Publication Data

US 2020/0234447 A1 Jul. 23, 2020

(30) Foreign Application Priority Data

Jan. 22, 2019 (GB) ...................... 1900883

(51) Int. Cl.
*G06T 7/10* (2017.01)
*G06N 20/00* (2019.01)
(Continued)

(52) U.S. Cl.
CPC .............. *G06T 7/10* (2017.01); *G06K 9/6289* (2013.01); *G06N 3/082* (2013.01); *G06N 20/00* (2019.01);
(Continued)

(58) Field of Classification Search
CPC ...................... G06N 3/08; G06N 5/046; G06T 2207/20081; G06T 2207/30252
See application file for complete search history.

(56) References Cited

U.S. PATENT DOCUMENTS 8,566,413 B2  10/2013  Horvitz
2013/0194086 A1  8/2013  Igarashi et al.
(Continued)

FOREIGN PATENT DOCUMENTS

CN  108510473 A  9/2018
CN  109101878 A  12/2018
(Continued)

OTHER PUBLICATIONS

Sandler et al., "MobileNetV2: Inverted Residuals and Linear Bottlenecks," Proceedings of the IEEE Conference on Computer Vision and Pattern Recognition (CVPR), Jun. 2018, pp. 4510-4520. (Year: 2018).*
(Continued)

*Primary Examiner* — Ross Varndell
(74) *Attorney, Agent, or Firm* — Oblon, McClelland, Maier & Neustadt, L.L.P.

(57) ABSTRACT

An image processing method for segmenting an image, the method comprising:
  receiving an image;
  processing said image with a common processing stage to produce a first feature map;
  inputting said first feature map to a parallel processing stage, said second processing stage comprising first and second parallel branches that receive the first feature map; and
  combining the output of the first and second branches to produce a semantic segmented image,
  wherein the common processing stage comprises a neural network, the neural network having at least one separable convolution module configured to perform separable convolution and downsample the image to produce first feature map and said first branch comprises a
(Continued)

neural network comprising at least one separable convolution module configured to perform separable convolution.

17 Claims, 11 Drawing Sheets

(51) Int. Cl.
  *G06K 9/62* (2006.01)
  *G06N 3/08* (2006.01)
  *G06T 3/40* (2006.01)
  *G06T 5/30* (2006.01)
(52) U.S. Cl.
  CPC .............. *G06T 3/4046* (2013.01); *G06T 5/30* (2013.01); *G06T 2207/20081* (2013.01); *G06T 2207/20084* (2013.01)

(56) References Cited

U.S. PATENT DOCUMENTS

| | | | |
|---|---|---|---|
| 2016/0107682 | A1 | 4/2016 | Tan et al. |
| 2020/0012940 | A1* | 1/2020 | Liu .................. G06T 3/4007 |
| 2020/0134833 | A1* | 4/2020 | Biswas .................. G06K 9/342 |

FOREIGN PATENT DOCUMENTS

| | | |
|---|---|---|
| EP | 2 256 667 A1 | 1/2010 |
| WO | WO 2018/145028 A1 | 8/2018 |

OTHER PUBLICATIONS

Abadi, M. et. al., "TensorFlow: Large-Scale Machine Learning on Heterogeneous Distributed Systems," Preliminary White Paper, Nov. 9, 2015, arXiv:1603.04467v2 [cs.DC] Mar. 16, 2016, pp. 1-19.
Badrinarayanan, V. et al., "SegNet: A Deep Convolutional Encoder-Decoder Architecture for Image Segmentation," arXiv:1511.00561v3 [cs.CV] Oct. 10, 2016, pp. 1-14.
Chen-L-C., et al., "Semantic Image Segmentation With Deep Convolutional Nets and Fully Connected CRFs," Published as a conference paper at ICLR 2015, arXiv:1412.7062v4 [cs.CV] Jun. 7, 2016, pp. 1-14.
Chen, L-C. et al., "DeepLab: Semantic Image Segmentation with Deep Convolutional Nets, Atrous Convolution, and Fully Connected CRFs," arXlv:1606.00915v2 [cs.CVs], May 12, 2017, pp. 1-14.
Chollet, F., "Xception: Deep Learning with Depthwise Separable Convolutions," arXiv:1610.02357v3 [cs.CV], Apr. 4, 2017, 8 pages.
Cordts, M. et al., "The Cityscapes Dataset for Semantic Urban Scene Understanding," www.cityscapes-dataset.net, arXiv:1604.01685v2 [cs.CV] Apr. 7, 2016, 29 pages.
Girshick, R. et al., "Rich feature hierarchies for accurate object detection and semantic segmentation: Tech Report (v5)," arXiv:1311.2524v5 [cs.CV], Oct. 22, 2014, pp. 1-21.
Han, S. et al., "Deep Compression: Compressing Deep Neural Networks With Pruning, Trained Quantization and Huffman Coding," Published as a conference paper at ICLR 2016, arXiv:1510.00149v5 [cs.CV] Feb. 15, 2016, pp. 1-14.
He, K. et al., "Deep Residual Learning for Image Recognition," arXiv:1512.03385v1 [cs.CV] Dec. 10, 2015, pp. 1-12.
Howard, A. G. et al., "MobileNets: Efficient Convolutional Neural Networks for Mobile Vision Applications," arXiv:1704.04861v1 [cs.CV] Apr. 17, 2017, 9 pages.
Courbarlaux, M. et al., "Binarized Neural Networks: Training Neural Networks with Weights and Activations Constrained to +1 or −1," arXiv:1602.02830v3 [cs.LG], Mar. 17, 2016, 11 pages.
Ioffe, S. et al., "Batch Normalization: Accelerating Deep Network Training by Reducing Internal Covariate Shift," arXiv:1502.03167v3 [cs.LG], Mar. 2, 2015, pp. 1-11.
Lazebnik, S. et al., "Beyond Bags of Features: Spatial Pyramid Matching for Recognizing Natural Scene Categories," In CVPR, vol. 2, 2006, 8 pages.
Li, H. et al., "Pruning Filters for Efficient Convnets," Published as a conference paper at ICLR 2017, arXiv:1608.08710v3 [cs.CV], Mar. 10, 2017, pp. 1-13.
Liu, W. et al., "SSD: Single Shot MultiBox Detector," arXiv:1512.02325v5 [cs.CV], Dec. 29, 2016, pp. 1-17.
Liu, Z. et al., "Rethinking the Value of Network Prunin," Published as a conference paper at ICLR 2019, arXiv:1810.05270v2 [cs.LG[, Mar. 5, 2019, pp. 1-21.
Lucchi, A. et al., "Are Spatial and Global Constraints Really Necessary for Segmentation?" 2011 IEEE International Conference on Computer Vision, 2011, pp. 9-16.
Mazzini, D., "Guided Upsampling Network for Real-Time Semantic Segmentation," In BMVC, 2018, pp. 1-12.
Mehta, S. et al., "ESPNet: Efficent Spatial Pyramid of Dilated Convolutions for Semantic Segmentation," https://github.com/sacmehta/ESPNet, arXiv:1803.06815v3 [cs.CV], Jul. 25, 2018, pp. 1-29.
Paszke, A. et al., "ENet: A Deep Neural Network Architecture for Real-Time Semantic Segmentation," arXiv:1606.02147v1 [cs.CV], Jun. 7, 2016, pp. 1-10.
Poudel, R. P. K., et al., "ContexNet: Exploring Context and Detail for Semantic Segmentation in Real-time," In BMVC, 2018, pp. 1-11.
Rastegari, M. et al., "XNOR-Net: ImageNet Classification Using Binary Convolutional Neural Networks," In ECCV, arXiv:1603.05279v4 [cs.CV], Aug. 2, 2016, pp. 1-17.
Redmon, J. et al., "You Only Look Once: Unified, Real-Time Object Detection," In CVPR, http://pjreddie.com/yolo/, arXiv:1506.02640v5 [cs.CV], May 9, 2016, 10 pages.
Redmon, J. et al., "YOLO9000: Better, Faster, Stronger," arXiv:1612.08242v1 [cs.CV], Dec. 25, 2016, pp. 1-9.
Romera, E. et al., "ERFNet: Efficient Residual Factorized ConvNet for Real-Time Semantic Segmentation," IEEE Transactions on Intelligent Transportation Systems, vol. 19, No. 1, Jan. 2018, pp. 263-272.
Ronneberger, O. et al., "U-Net: Convolutional Networks for Biomedical Image Segmentation," In MICCAI, arXiv:1505.04597v1 [cs.CV], May 18, 2015, pp. 1-8.
Russakovsky, O. et al., "ImageNet Large Scale Visual Recognition Challenge," International Journal of Computer Vision (IJCV), Sep. 2014, arXiv:1409.0575v2 [cs.CV], Dec. 1, 2014, 38 pages.
Sandler, M. et al., "MobileNetV2: Inverted Residuals and Linear Bottlenecks," Mobile Networks for Classification, Detection and Segmentation, arXiv:1801.04381v4 [cs.CV], Mar. 21, 2019, 14 pges.
Long, J. et al., "Fully Convolutional Networks for Semantic Segmentation," PAMI, 2016, 10 pages.
Sifre, L., "Rigid-Motion Scattering for Image Classification," PhD Thesis, Oct. 6, 2014. 128 pages.
Simonyan, K. et al., "Very Deep Convolutional Networks for Large-Scale Image Recognition," Published as a conference paper at ICLR 2015, arXiv:1409.1556v6 [cs.CV], Apr. 10, 2015, pp. 1-14.
Visin, F. et al., "ReSeg: A Recurrent Neural Network-based Model for Semantic Segmentation," arXiv:1511.07053v3 [cs.CV], May 24, 2016, 8 pages.
Wu, S. et al., "Training and Inference With Integers in Deep Neural Networks," Published as a conference paper at ICLR 2018, arXiv.1802.04680v1 [cs.LG], Feb. 13, 2018, pp. 1-14.
Yu, C. et al., "BISeNet: Bilateral Segmentation Network for Real-time Semantic Segmentation," arXiv:1808.00897v1 [cs.CV], Aug. 2, 2018, pp. 1-17.
Zeiler, M. D., et al., "Visualizing and Understanding Convolutional Networks," ECCV 2014, Part 1, LNCS 8689, 2014, pp. 818-833.
Zhao, H. et al., "ICNet for Real-Time Semantic Segmentation on High-Resolution Images," arXiv:1704.08545v2 [cs.CV], Aug. 20, 2018, 16 pages.
Zhao, H. et al., "Pyramid Scene Parsing Network," arXiv:1612.01105v2 [cs.CV], Apr. 27, 2017, 11 pages.
Zheng, S. et al., "Conditional Random Fields as Recurrent Neural Networks," In ICCV, Dec. 2015, pp. 1-17.

(56) References Cited

OTHER PUBLICATIONS

Levinshtein, A. et al., "Real-time deep hair matting on mobile devices," Preprint Available on http://arxiv.org/abs/1712.0716, arXiv:1712.07168v2 [cs.CV], Jan. 10, 2018, 7 pages.

Chen, L-C. et al., "Encoder-Decoder with Atrous Separable Convolution for Semantic Image Segmentation," Preprint Available at http://arxiv.org/abs/1802.02611, arXiv:1802.02611v3 [cs.CV], Aug. 22, 2018, pp. 1-18.

Japanese Office Action dated May 11, 2021 in Japanese Patent Application No. 2020-007450 (with English translation), citing documents AO and AP therein, 6 pages.

Yarin Gal, "Uncertainty in Deep Learning" Department of Engineering, University of Cambridge, Gonville and Caius College, Sep. 2016, [retrieved on Mar. 12, 2018]. Retrieved from the Internet: URL:http://mlg.eng.cam.ac.uk/yarin/thesis/thesis.pdf>, 169 pages.

\* cited by examiner

COMPUTER VISION SYSTEM AND METHOD

CROSS REFERENCE TO RELATED APPLICATIONS

This application is based upon and claims the benefit of priority from prior United Kingdom patent application number GB1900883.8 filed on 22 Jan. 2019, the entire contents of which are incorporated herein by reference.

FIELD

Embodiments relate to a computer vision system and method.

BACKGROUND

Many computer vision tasks, for example object recognition and registration require the segmentation of an image where regions of the image are provided with a label. Semantic Segmentation provides detailed pixel-level specification, which is particularly suited for applications which often require obstacle detection and accurate boundary detection. Such applications include but are not limited to autonomous vehicles and driver assistants, embedded and wearable devices.

Modern semantic segmentation methods achieve highly accurate results, but often at the cost of reduced efficiency. Recent development of convolutional neural networks (CNNs) marks significant improvement in the results achieved by these networks. Their effectiveness, however, is largely dependent on the number of operations and parameters involved in the model. Modern semantic segmentation methods require more than a second to perform object classification of a single image, even if the processing is performed on a high-end Graphic Processing Unit (GPU).The complexity of these methods hinders their deployment in real-time applications.

Autonomous driving is a complex task and object detection and classification is just a pre-processing step of other time-critical tasks. Such systems often benefit from systems with faster than real-time capabilities. Therefore, a new approach for semantic segmentation is required where the object detection and classification system is capable of faster than real-time performance without compromising the precision of the object classification.

DETAILED DESCRIPTION

Figure 1:
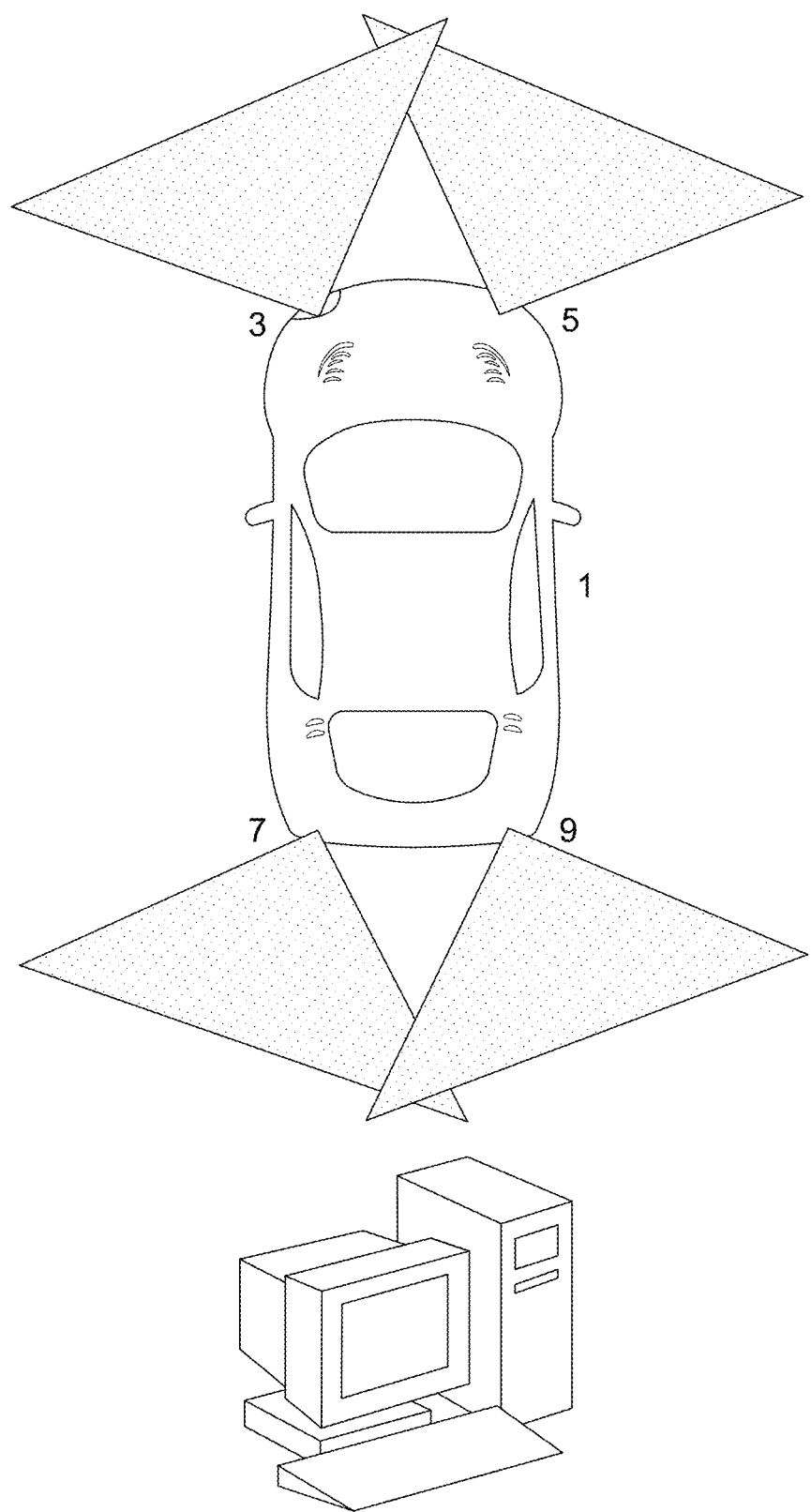
FIG. 1 is a system in accordance with an embodiment implemented on a vehicle.

In an embodiment, an image processing method for segmenting an image is provided, the method comprising:
   receiving an image;
   processing said image with a common processing stage to produce a first feature map;
   inputting said first feature map to a parallel processing stage, said second processing stage comprising first and second parallel branches that receive the first feature map; and
   combining the output of the first and second branches to produce a semantic segmented image,
   wherein the common processing stage comprises a neural network, the neural network having at least one separable convolution module configured to perform separable convolution and downsample the image to produce first feature map and said first branch comprises a neural network comprising at least one separable convolution module configured to perform separable convolution.

The disclosed system addresses a technical problem tied to computer technology and arising in the realm of computing, namely the technical problem of providing real time semantic segmentation The disclosed system solves this technical problem by a common processing stage that precedes a parallel processing stage with two parallel branches. The common processing stage down samples the image and computes low level features. Thus, it services two features, it allows low level features to be extracted and down samples the image to allow it be to input to a branch configured to extract context information from the image.

The above method allows real-time semantic segmentation and actually can produce results above real time semantic segmentation on high resolution image data (1024×2048 px). Thus, it is suited to efficient computation on low memory embedded devices. The above embodiment, uses a two-branch method for fast segmentation. The first "common" processing stage can be considered to be a 'learning to downsample' module which computes shallow low level features for multiple resolution branches simultaneously.

This architecture allows the combination of spatial detail at high resolution with deep features extracted at lower resolution, In the above embodiment, the first branch, aims at classifying or otherwise identifying the objects that make up the image or the scene and assigns labels to the object present in the scene. Whereas the second branch is primarily responsible for maintaining information concerning object boundaries for high resolution segmentation results.

In the above embodiment, the first branch comprises a deep network.

The model of the above embodiment reduces computational cost since:
i) In context processing there is a need to learn more complex and abstract features thus a deeper network is needed. However, a higher resolution input is not required, hence model cost is reduced by using lower resolution input on context branch.

ii) In boundary processing there is a need for a high resolution input. However, there is not a need to see large field of view, hence model cost is reduce by using few layers in the detail branch.

iii) Hence, operating the two branches for two different purposes as mentioned above reduces the overall model cost.

iv) The second branch can be thought of as a skip connection and the inventors have realised that the first and second branches can share the initial processing stages.

v) The image processing network has been designed to be of low capacity,

In an embodiment, the second branch functions as a skip connection to allow the first feature map to be combined with the output of the first branch. In some embodiments, the feature map is passed through the second branch unchanged. In other embodiments the first feature map is passed through one or more neural network layers to, for example, change the resolution of the first feature map prior to combination with the output of the first branch. In an embodiment, the second branch comprises one or more 2D convolution layers.

In an embodiment, the output from the first and second branches is combined at just one stage. In an embodiment, there are just two branches.

The first branch comprises a plurality of modules that allow context information to be extracted, the first branch comprises a deep network, the number of layers in the first branch is larger than the number of layers in the common processing stage.

In an embodiment, the above system uses depth-wise separable convolutions to factorize standard convolution (Conv2d) into a depth-wise convolution (DWConv), also known as spatial or channel-wise convolution, followed by a 1×1 point-wise convolution layer. Cross-channel and spatial correlation is therefore computed independently, which drastically reduces the number of parameters, resulting in fewer floating point operations and fast execution time. Hence computation costs and memory requirements are reduced.

In an embodiment, the output of the first and second branches is combined at just one stage. The output of the first and second branches is combined only once.

In one embodiment, the output of the first and second branches are combined at a fusion stage, wherein said fusion stage comprises upsampling the output of the first branch and adding the upsampled output of the first branch to the output of the second branch wherein adding comprises adding corresponding values of the upsampled output of the first branch and the second branch.

In a further embodiment, the output of the first and second branches is combined by adding. In an embodiment the second feature map of size a*b*c (from low resolution after upsampling) is combined with the second feature map of size a*b*c to create combined feature map C of size a*b*c by adding both numbers. No concatenation is needed and this allows the memory footprint to be kept small.

The upsampled output from the first branch may be subjected to depthwise convolution prior to adding to the output from the second branch wherein the depthwise convolution is performed with a dilation factor that is greater than 1.

In a further embodiment, the upsampled output from the first branch that has been subjected to depthwise convolution with a dilation factor that is greater than 1 and the output from the second branch are subjected to two dimensional convolution prior to adding.

In one embodiment, the depth-wise convolution modules in the first branch are bottleneck architecture modules. Bottleneck architecture modules perform a feature expansion which is followed by a depthwise convolution that is followed by a point convolution. Therefore, these can also be considered to be implementing depthwise separable convolution.

In an embodiment, the depth-wise convolution modules in the first branch are bottleneck residual architecture modules. There may be a plurality of residual bottleneck architecture modules. The number of output channels from the residual bottleneck architecture modules may increase in subsequent modules in the plurality of residual bottleneck architecture modules.

The first feature map may be subjected to standard convolution prior to be processed by said depthwise convolution modules. A final standard convolution module may be provided after the residual bottleneck architecture modules.

In one embodiment, a pyramid pooling module is provided between the final standard convolution module and the residual bottleneck architecture modules.

The common processing stage may comprise a plurality of depthwise separable convolution modules. The image may be subjected to standard convolution prior to processing by said depthwise separable convolution modules in the common processing stage.

In an embodiment, the common processing stage comprises three layers to ensure that low-level feature sharing is valid, and efficiently implemented. In embodiment, the first layer is a standard convolutional layer (Conv2D) and the remaining two layers are depthwise separable convolutional layers (DSConv) Although DSConv is computationally more efficient, Conv2D is employed here since the input image only has three channels, making DSConv's computational impact insignificant at this stage.

In an embodiment, the layers of the common processing stage use stride 2, followed by batch normalization and ReLU. The spatial kernel size of the convolutional and depthwise layers is 3×3. In an embodiment, the nonlinearity between depthwise and pointwise convolutions is omitted.

In an embodiment, the combined output of the first and second branches is processed by a classifier. In an embodiment, the classifier comprises at least one separable convolution module. The classifier may comprise a softmax layer. The at least one separable convolution module is a depthwise separable convolution module.

In an embodiment, since floating point multiplications are costly compared to integer or binary operations, runtime can be further reduced using quantization techniques for DCNN filters and activation values.

In an embodiment, binary quantization technique may be used.

Further, in an embodiment, pruning is applied to reduce the size of a pre-trained network, resulting in faster runtime, a smaller parameter set, and smaller memory footprint In an embodiment, a method of training a model is provided, said model being for semantic segmenting an image, the model comprising:
  a common processing stage to produce a first feature map;
  a parallel processing stage, said second processing stage comprising first and second parallel branches that receive the first feature map; and combining the output of the first and second branches to produce a semantic segmented image, wherein the common processing stage comprises a neural network, the neural network having at least one separable convolution module configured to perform separable convolution and downsample the image to produce first feature map and said first branch comprises a neural network comprising at least one separable convolution module configured to perform separable convolution, the training method comprising:

providing training data, the training data comprising image and semantic segmented information concerning said images;

training said model using said images as the input and the semantic segmented information as the output, wherein the two stages are trained together.

In further embodiment, parameter pruning may be implemented during training.

In a further embodiment, the training method may further comprise adapting the model during training to add a second output on said first branch, the method further comprising training using the images as input and determining the loss by comparing with both the semantic segmented information at both the output and at the second output and updating the weights during training by using the determined losses from both outputs.

In an embodiment, an image processing system for segmenting an image is provided, the system comprising:

an interface and a processor, said interface having an image input and being adapted to receive a first image, said processor being adapted to;

process said image with a common processing stage to produce a first feature map;

input said first feature map to a parallel processing stage, said second processing stage comprising first and second parallel branches that receive the first feature map; and combine the output of the first and second branches to produce a semantic segmented image, wherein the common processing stage comprises a neural network, the neural network having at least one separable convolution module configured to perform separable convolution and downsample the image to produce first feature map and said first branch comprises a neural network comprising at least one separable convolution module configured to perform separable convolution.

In an embodiment, the system is implemented on a vehicle, vehicles on which the system can be implemented include but are not limited to autonomous and semi-autonomous vehicles, equipped with one or a plurality of still digital cameras and or video digital cameras, which provide the input high-resolution images to the system. In an embodiment, the system is realised on a graphics processing unit or central processing unit located in the vehicle. The objective of the system is to classify the object surrounding the vehicle and facilitate the safe navigation of the vehicle towards its final destination.

Thus, in a further embodiment, a detection system for a vehicle is provided, said detection system, the detection system comprising the image processing system as described above, being adapted to receive an image and determine objects from said image by segmenting said image.

FIG. 1 is used to illustrate an embodiment of the object classification network, which has been provided on board of a vehicle, so that the system travels along with the vehicle. FIG. 1 shows a schematic of a car 1, where the car 1 is equipped with a collision avoidance system. The collision avoidance system comprises four cameras 3, 5, 7, 9 where a camera 3, 5, 7, 9 is provided in each corner of car 1. Each of the cameras has a wide field of view (FOV) which enables the camera to see a higher extent of the observable world. In one embodiment, each camera 3, 5, 7, 9 may be provided with a very wide-angle fisheye lens, which produces a wide panoramic image. The image from each camera is produced separately, however, the FOV of front cameras 3 and 5 may overlap, leaving no area in front of car 1 where the view is obstructed. FOV of rear cameras 7 and 9 may also overlap, leaving no area behind car 1 where the view is obstructed.

In one embodiment of the system, the image from each camera 3, 5, 7, 9 is processed separately by a single central processing unit (CPU) or GPU. In a further embodiment of the system, each camera 3, 5, 7, 9 is provided with a separate CPU or GPU, which processes the image and forwards the processed image to the central CPU of car 1.

The embodiment discussed above relates to an autonomous system for driving. However, the image processing method can also be applied to any system requiring semantic segmentation of images, for example, wearable tech etc.

Figure 2:
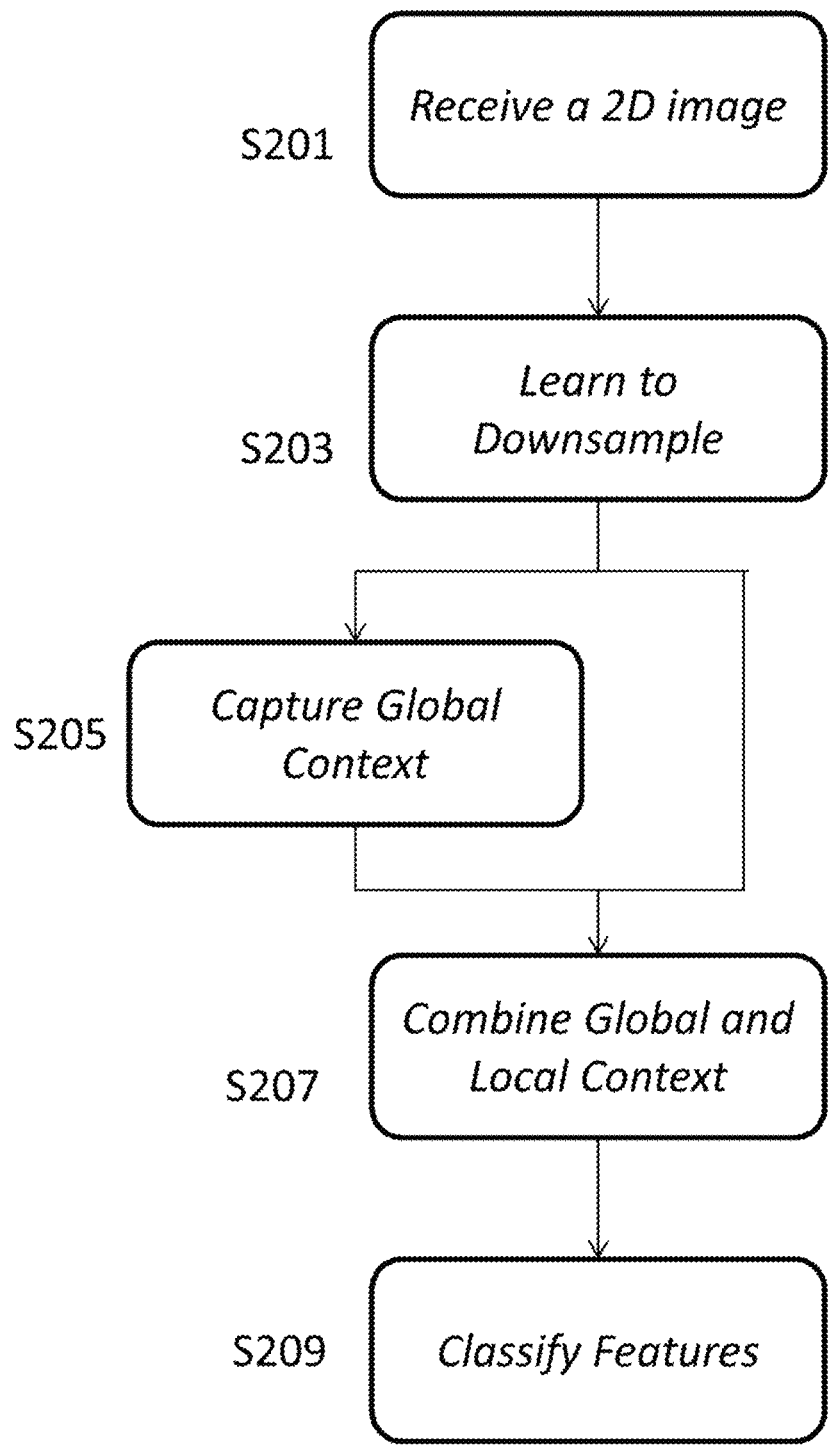
FIG. 2 is a brief flow diagram of a neural network that can be used in the system of FIG. 1.

FIG. 2 shows a flow diagram of a system, in accordance with an embodiment, for object identification and classification.

In an embodiment, the object classification system comprises a combination of a convolutional neural network with a multi-branch architecture with the encoder-decoder framework, where the initial convolutions at different resolution levels are shared by the branches.

In FIG. 2 is shown the architecture of a multi-branch convolutional neural network in accordance with an embodiment, where the neural network comprises two branches.

The first branch is responsible for capturing the global context of the scene and the second one is responsible for refining the global context with spatial detail. The local context of the scene is extracted from the full resolution image and therefore the branch comprises a small number of convolutional layers. The global context is captured at a lower image resolution which allows for the higher number of convolutional layers in the said branch. Furthermore, in this embodiment of the system the encoder-decoder framework is also employed. Integrating a skip connection in the architecture of the neural network allows the initial layers of the two branches to be shared, which allows for shallow low level features to be extracted simultaneously for the two branches. A skip connection is employed only once for runtime efficiency. Furthermore, employing pooling convolutional operations in the high resolution branch (i.e. in the shared initial layers) avoids the need for downsampling the image to a lower resolution for the low-resolution branch of the network. The skip connection allows the local context of the scene extracted in the initial layers of the network to be merged with the global features extracted by the low-resolution sub-network branch.

In step S201, camera 3,5,7,9 captures an image of a scene, where the scene may comprise one or more objects. In an embodiment, the scene is a city street scene. The captured image is input to an object classification system, where the objects in the scene will be consequently identified and provided with a label by a neural network.

In an embodiment, after Step 201, a 'learning to downsample' module is provided. The input image is provided in full resolution to the 'learning to downsample' module. The neural network in Step S203 extracts the local context of the scene and generates a downsampled representation of the input image.

After Step S203, in an embodiment, the path of the image diverges in two independent sub network branches. In the first branch, the low resolution branch, the downsampled representation of the image is provided and the global context of the scene is extracted by a convolutional neural network in Step S205. The second branch is implemented as a skip connection allowing for the recovery of the spatial detail in step S207, where the features of the two branches are combined.

In FIG. 2, the 'learning to downsample' module computes shallow low level features for multiple resolution branches of the neural network. How this is achieved, in accordance with an embodiment, will be described with reference to steps S303 and S305 in FIG. 3.

The input image can be represented in a three-dimensional matrix format. Each pixel comprises three channels, where each channels holds a numerical value, associated with the intensity of one of the three colours—red, green and blue (RGB). In standard computation, 2D convolutions can be used employing a h*w*c filter, where h is height, w is width and c is channel. Since h*w*3 (convolution on image with RGB) is similar to h*w*1 (DW convolution), standard convolution is fine here. Note, usually the number of feature channels increase rapidly in CNNs, so h*w*32/64/128 is not unusual. In an embodiment, depth-wise convolutions are used with the increasing number of channels.

In Step S303, the first layer of the convolutional neural network is a two-dimensional pooling convolution layer in order to achieve more efficient object classification as described in the previous paragraph. The pooling layer performs downsampling operation, where the dimensions of the outputted feature maps are reduced by a factor relative to the stride of the layer. The stride of the layer can be considered to be how much the convolutional kernel is moved as it is scanned across the image. For example, a pooling convolutional layer with stride 1 (1 pixel) will not affect the spatial dimensions of the feature maps, whereas a pooling convolutional layer with stride 2 will downsample their dimensions by a factor of 2. A smaller feature map may yield faster inference, however at the cost of sacrificed prediction accuracy.

In this embodiment, the first convolutional layer applies a plurality of filters or kernels to the input volume. Each filter is compared with the scene and a 2-dimensional feature map is generated. Feature maps represent the spatial arrangements of the activations caused as a result of a match between a filter and an object or feature in the scene. All feature maps are stacked along the depth dimension and produce the output volume. For example, a convolutional neural network comprised of 32 output channels applies 32 filters to the input volume, and generates 32 feature maps which are stacked to render an output volume with depth dimension of 32.

In an embodiment, the object classification is performed with neural networks which utilise a number of depth-wise separable convolution layers. In depth-wise convolution, two-dimensional convolution is performed separately on each input channel and a feature map for each input channel is generated. All feature maps are stacked back together at the end of the convolution procedure. For example, camera 3, 5, 7, 9 provides the neural network with a colour digital image, where each pixel comprises a set of three values, one for red, one for green, and one for blue. When the image is processed with a depth-wise separable convolution layer, two-dimensional convolution is performed separately for each colour.

The depth-wise convolution followed by pointwise convolution does not significantly reduce the accuracy of the object detection in comparison to standard convolution layers. The information is first computed on a channel-wise level, followed by a cheaper standard convolution that combines the channel-wise information. Since the convolution only uses a kernel 1×1, it is faster and requires less parameters.

The parameters of the convolution layers in the 'learning to downsample' module in accordance with an embodiment are presented in Table 1.

TABLE 1

| Input | Operator | Output channels | Repeats | Stride |
| --- | --- | --- | --- | --- |
| 1048 × 2048 × 3 | Conv2d | 32 | 1 | 2 |
| 512 × 1024 × 32 | DWConv | 48 | 1 | 2 |
| 256 × 512 × 48 | Conv2d (1 × 1) | 48 | 1 | 1 |
| 256 × 512 × 48 | DWConv | 64 | 1 | 2 |
| 128 × 256 × 64 | Conv2d (1 × 1) | 64 | 1 | 1 |

In an embodiment, a pooling convolution layer 403 applies 32 filters to the full resolution image 401 and generates 32 feature maps.

Figure 4:
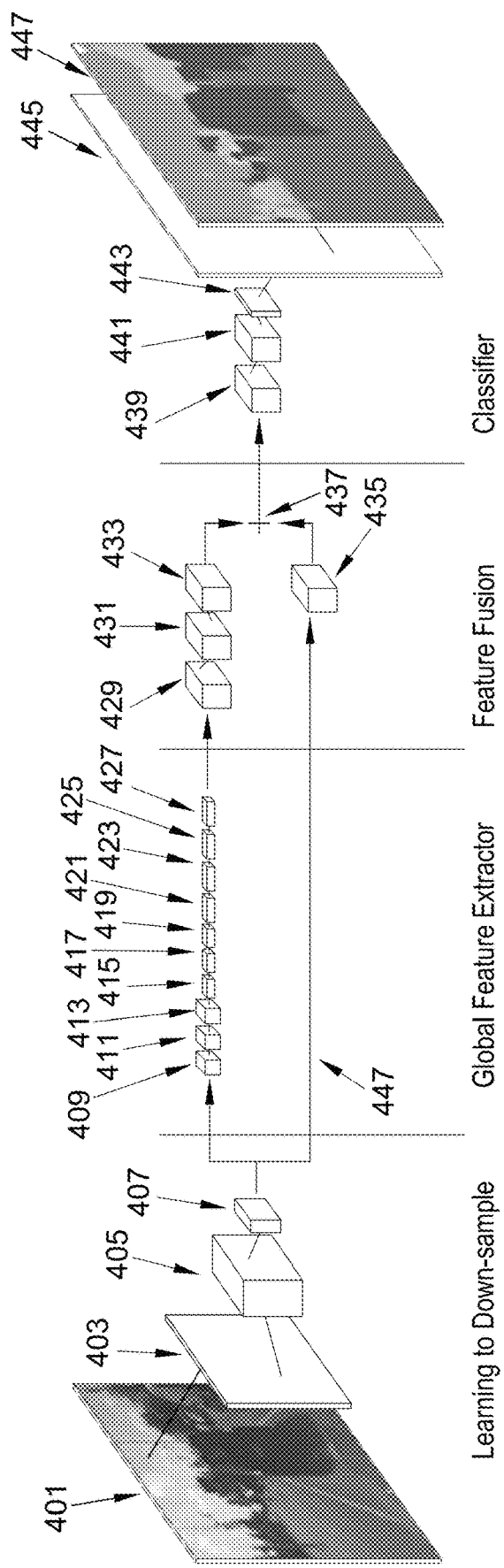
FIG. 4 is a schematic of the network architecture in accordance with an embodiment.

In Step S305, two depth-wise separable convolution with kernel size of 3×3 are used. Each depth-wise separable convolution block comprises a depth-wise convolution layer followed by a 1×1 point wise convolution layer. In FIG. 4, the two layers of each depth-wise separable convolution is represented as a single block.

The first depth-wise separable convolution block 405 has 32 input channels, 48 output channels and a stride 2.

The second depth-wise separable convolution block 407 has 48 input channels, 64 output channels and a stride 2.

Thus, in this embodiment, the 'learning to downsample' module comprises 5 neural network layers.

In FIG. 2, the first subnetwork branch was described to label objects in the scene with the appropriate label. How this is achieved, in accordance with an embodiment, will be described with reference to steps S307 and S309 in FIG. 3.

At the output of the 'learning to downsample' module, the image dimensions, length h and width w, are reduced by a factor of n. Therefore the image is downsampled by a factor of $n^2$. The computational time of the system and the achieved accuracy of the object classification are both inversely proportional to the value of factor n.

The factor of n may range between 2 and 32 and is determined by the number of pooling layers comprised in the 'learning to downsample' module.

In the above described embodiment of the network for object classification, the spatial dimensions of the input image are reduced by a factor of n=8. Therefore the image is downsampled by a factor of 64 at the output of the 'learning to downsample' module.

In an embodiment, the depth-wise convolution layers may be used within bottleneck blocks. Bottleneck residual blocks transfer the input from c to c' channels with height h, width w, expansion factor t, convolutional type kernel-size/stride s and non-linear function f following Table 2.

In the bottleneck block, the input volume is expanded and then it is filtered with a depth-wise convolution layer followed by a pointwise convolution.

In general, first a pointwise convolution is applied (row 1). Then depth-wise convolution and pointwise convolution (row 2 and 3 are applied).

In one embodiment, the following process is followed:
Conv2d 1/1
($1 \times 1 \times c \times t*c$ parameters)
($h \times w \times 1 \times 1 \times c \times t*c$ operations)
    Conv2d 3/s
($3 \times 3 \times t*c \times c'$ parameters)
($h/s \times w/s \times 3 \times 3 \times t*c \times c'$ operations)

However, in an alternate, embodiment, the following could be used
Conv2d 1/1
($1 \times 1 \times c \times t*c$ parameters)
($h \times w \times 1 \times 1 \times c \times t*c$ operations)
    DWConv3/s
($3 \times 3 \times 1 \times t*c$ parameters)
($h/s \times w/s \times 3 \times 3 \times 1 \times t*c$ operations)
    Conv2d 1/1
($1 \times 1 \times t*c \times c'$ parameters)
($h/s \times w/s \times 1 \times 1 \times t*c \times c'$ operations)

In the alternative embodiment above, less computation is required and the parameters are fewer.

Learning features at a higher resolution and projecting them to a lower resolution benefit the feature learning procedure. Furthermore, utilizing depth-wise convolution in the bottleneck blocks provides computational efficiency and significantly reduces the memory footprint.

In a further embodiment, residual connections may be incorporated in the bottleneck blocks forming bottleneck residual blocks. Residual connection may be used within the bottleneck blocks only if the input and the output volumes have the same spatial dimensions and number of feature maps. A residual connection represents a linear layer which is connected from the input of the bottleneck block to its output. The additional connection layer allows for more effective gradient propagation across multiplier layers and improves the training of the neural networks.

In an embodiment, the bottleneck residual blocks used in Step S307 for object classification system have the structure shown in Table 2. The first layer is a standard two-dimensional convolution layer which expands the dimensions of the input volume by increasing the number of the features maps by a factor of t.

TABLE 2

| Input | Operator | Output |
|---|---|---|
| $h \times w \times c$ | Conv2d 1/1, f | $h \times w \times tc$ |
| $h \times w \times tc$ | DWConv 3/s, f | $\frac{h}{s} \times \frac{w}{s} \times tc$ |
| $\frac{h}{s} \times \frac{w}{s} \times tc$ | Conv2d 1/1, — | $\frac{h}{s} \times \frac{w}{s} \times c'$ |

In the second layer of the bottleneck residual blocks, a depth-wise convolution filter is used to extract features from the scene. The depth-wise convolution has stride s, therefore the output dimensions of the feature maps will be spatially reduced by a factor of s. In convolution layers where the stride is 1, the spatial size of the feature maps is unaffected. The reduction of the spatial size effectively reduces the number of computations in the subsequent network layers. Since convolutions are computed at each depth separately, DWconv improves upon standard convolutions significantly. The reduction of the spatial size effectively reduces the number of computations (not parameters) in subsequent network layers.

The depthwise convolution followed by pointwise convolution does not significantly reduce the accuracy of the object detection in comparison to standard convolution layers. The information is first computed on a channel-wise level, followed by a cheaper standard convolution that combines the channel-wise information. Since the convolution only uses a kernel 1×1, it is faster and requires less parameters.

Lastly, in the bottleneck residual blocks, the output volume generated by the depth-wise separable convolution layer may be projected back to its original low-dimensional representation using a second layer of two-dimensional convolution. The expansion factor t used for the first and the second two-dimensional convolution is the same for the two layers.

In an embodiment, the bottleneck residual blocks in step S307 are followed by a pyramid pooling module S309. The pyramid pooling module partitions the image into divisions from finer to coarser levels, and aggregates local features in them. Spatial pyramid pooling makes it possible to generate representations from arbitrarily sized images/windows for testing, and allows feeding images with varying sizes or scales during training.

Figure 5:
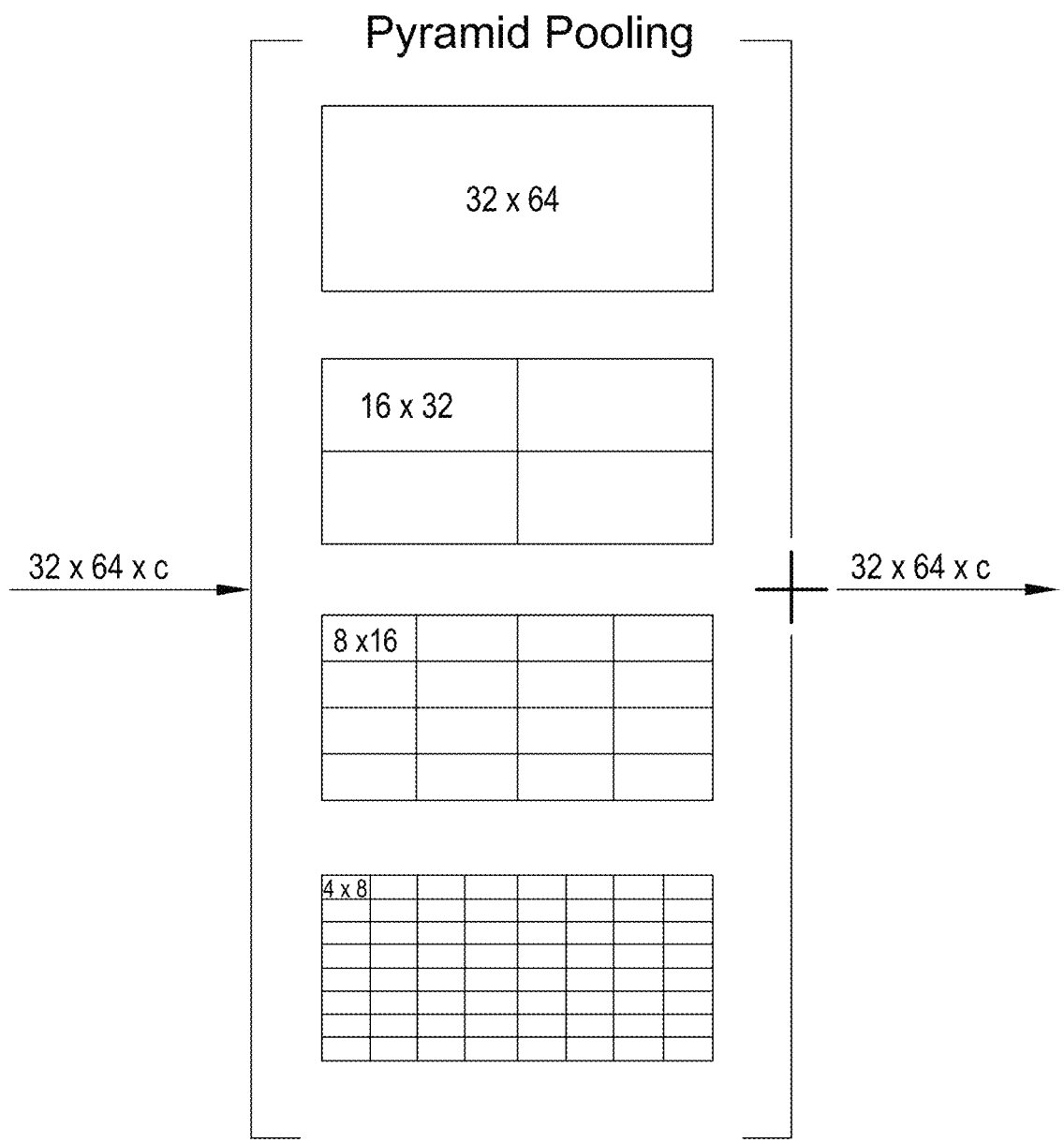
FIG. 5 is a schematic of the pyramid pooling module architecture according to an embodiment.

The pyramid pooling module is shown in more detail in FIG. 5. Here, it is comprised of four kernels, where the resolution of each kernel is 32×64, 16×32, 8×16 and 4×8 respectively. The kernels are equally distributed over the feature map output of Step S307. The resultant four feature maps are bilinearly up-sampled and added together to generate a single feature map output. It is important to note that the feature maps are added. This avoids the need to store all resolutions in the memory.

Table 3 shows the details of the layers that may be used for capturing global context in accordance with an embodiment.

TABLE 3

| Input | Operator | Expansion Factor | Output Channels | Repeats | Stride |
|---|---|---|---|---|---|
| 128 × 256 × 64 | Bottleneck | 6 | 64 | 3 | 2 |
| 64 × 128 × 64 | Bottleneck | 6 | 96 | 3 | 2 |
| 32 × 64 × 96 | Bottleneck | 6 | 128 | 3 | 1 |
| 32 × 64 × 128 | PPM | — | 128 | — | — |

This is also shown pictorially in FIG. 4. After the 'Learning to downsample' module the network branches out into two branches. The first network branch comprises 9 bottleneck residual blocks, 409, 411, 413, 415, 417, 419, 421, 423, 425, and 427 followed by a pyramid pooling module 427. The second branch 447 represents a skip connection.

As will be appreciated by those skilled in the art, the bottleneck residual operator is actually implemented via a plurality of layers as described with reference to table 2. However, as a shorthand in FIG. 4 they are shown as a single entity.

TABLE 4

| Input | Block | t | c | n | s |
|---|---|---|---|---|---|
| 1024 × 2048 × 3 | Conv2D | — | 32 | 1 | 2 |
| 512 × 1024 × 32 | DSConv | — | 48 | 1 | 2 |
| 256 × 512 × 48 | DSConv | — | 64 | 1 | 2 |

TABLE 4-continued

| Input | Block | t | c | n | s |
|---|---|---|---|---|---|
| 128 × 256 × 64 | bottleneck | 6 | 64 | 3 | 2 |
| 64 × 128 × 64 | bottleneck | 6 | 96 | 3 | 2 |
| 32 × 64 × 96 | bottleneck | 6 | 128 | 3 | 1 |
| 32 × 64 × 128 | PPM | — | 128 | — | — |
| 23 × 64 × 128 | FFM | — | 128 | — | — |
| 128 × 256 × 128 | DSConv | — | 128 | 2 | 1 |
| 128 × 256 × 128 | Conv2D | — | 19 | 1 | 1 |

First and second bottleneck residual layers 409 and 411 have 64 input channels, 64 output channels, stride 1 and expansion factor (t) of 6.

Third bottleneck residual layer 413 has 64 input channels, 64 output channels, stride 2 and expansion factor of 6.

Fourth and fifth bottleneck residual layers 415 and 417 have 64 input channels, 64 output channels, stride 1 and expansion factor of 6.

Sixth bottleneck residual layer 419 has 64 input channels, 96 output channels, stride 2 and expansion factor of 6.

Seventh and eighth bottleneck residual layers 421 and 423 have 96 input channels, 96 output channels, stride 1 and expansion factor 6.

Ninth bottleneck residual layer 425 has 96 input channels, 128 output channels, stride 2 and expansion factor of 6.

The last layer of the global feature extractor is a pyramid pooling layer 427. Pyramid pooling layer 427 has 128 input channels and 128 output channels.

In an embodiment, the learning to downsample module is primarily responsible for refining the global context, extracted by the global feature extractor. In order to achieve higher accuracy and better object classification results, the depth-wise separable convolution blocks in the learning to downsample module are employed directly. While the bottleneck implementation of depth-wise separable convolution favours network branches comprised of a big number of layers, where the speed of operation is more important than the achieved classification accuracy, the direct approach provides higher precision of the object classification at the cost of reduced operating speed. The smaller number of neural network layers in the learning to downsample, however, compensates for the higher number of operations.

Figure 3:
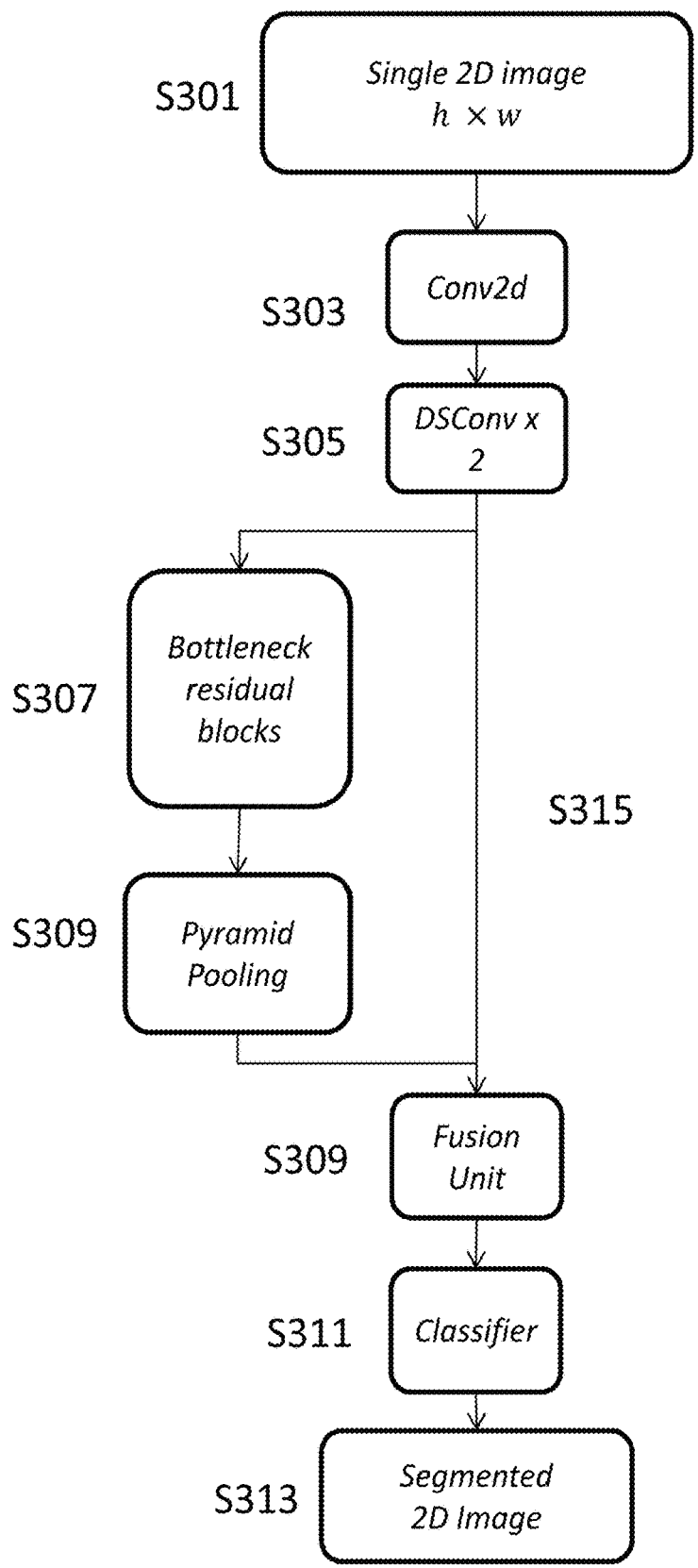
FIG. 3 is a detailed flow diagram of the fast neural network for object classification.

In an embodiment, a single feature fusion module is used to merge the output volumes of the two branches of the network, Step S309 of FIG. 3. The process of merging feature maps involves holding the features in the system memory. A single feature fusion unit accounts for more efficient design which complies with the low resource devices requirement.

In an embodiment, the output volumes of the two branches differ both in number of feature maps and in spatial dimensions. The spatial dimensions of the feature maps of the lower-resolution branch are smaller than the spatial dimensions of the feature maps of the full-resolution branch. Therefore, the output of the lower-resolution sub-network branch is processed by an Upsampling layer 429, where the feature maps are up-scaled by a factor of 4. The architecture of the feature fusion module is also presented in Table 5.

TABLE 5

| Branch -1 | Branch -4 |
|---|---|
| — | Upsample × 4 |
| — | DWConv (dilation 4) |
| Conv2d 1/1 — | 3/1, f |
| | Conv2d 1/1, — |
| | Add, f |

In a further embodiment, the upsampling layer is followed by a depth-wise convolution layer 431 with a dilation factor different from 1. Dilation convolutional layer increases the space between the objects on the feature maps. Dilating depth-wise convolution affects only the size of the kernel, in particular the size of the kernel is increased exponentially. For example, a Depth-wise convolution with dilation factor of 1 will have an original kernel size of 3 ×3, whereas a convolution with dilation factor of 2 will have kernel size of 7×7 and convolution with dilation factor of 4 will have kernel size of 15×15. It should be noted that although the dilation is of kernel size 7×7, it only has 9 computations.

Summation of output volumes can only be implemented if the volumes comprise the same spatial dimensions and the same number of feature maps. Therefore a layer of two-dimensional convolution is used to generalise the outputs of the two branches before they are added together, 433 and 435 respectively. These two convolutional layers ensure the feature maps of the two branches comprise the same dimensions.

In the above described embodiment, convolutional layer 433 has 128 input channels and 128 output channels, while convolutional layer 435 has 48 input channels and 128 output channels.

In the final step, the feature maps are just directly added together 437. Thus, the number of parameters that need to be stored in the memory does not increase.

In an embodiment, the feature fusion unit is followed by a classifier module, Step S311 of FIG. 3. The architecture of the classifier can be described in relation to Table 4 and blocks 439, 441, 443, 445 and 447 of FIG. 4. The classifier employs two depth-wise separable convolution operations 439 and 441 and a pointwise convolution 443. The pointwise convolution layer 443 comprises only 19 output channels, one output channel for every one of the 19 classes in the used Cityscapes segmentation dataset. The final two layers of the classifier are an upsampling layer 445, which restores the initial spatial dimensions of the image and a soft-max convolutional layer, 447, which yields the probability scores for each class label. The additional convolutional layers of the classifier placed after the feature fusion module improve the accuracy of the system for object classification.

The parameters of the convolution layers in the classifier module in accordance with an embodiment are presented in Table 5.

TABLE 5

| Input | Operator | Output channels | Repeats | Stride |
|---|---|---|---|---|
| 128 × 256 × 128 | DWConv | 128 | 1 | 1 |
| 128 × 256 × 128 | Conv2d (1 × 1) | 128 | 1 | 1 |
| 128 × 256 × 128 | DWConv | 128 | 1 | 1 |
| 128 × 256 × 128 | Conv2d(1 × 1) | 128 | 1 | 1 |
| 128 × 256 × 128 | Conv2d (1 × 1) | 19 | 1 | 1 |
| 128 × 256 × 19 | Upsampling | 19 | 1 | 1 |
| 1048 × 2048 × 19 | Soft-max | 19 | 1 | 1 |

Figure 6:
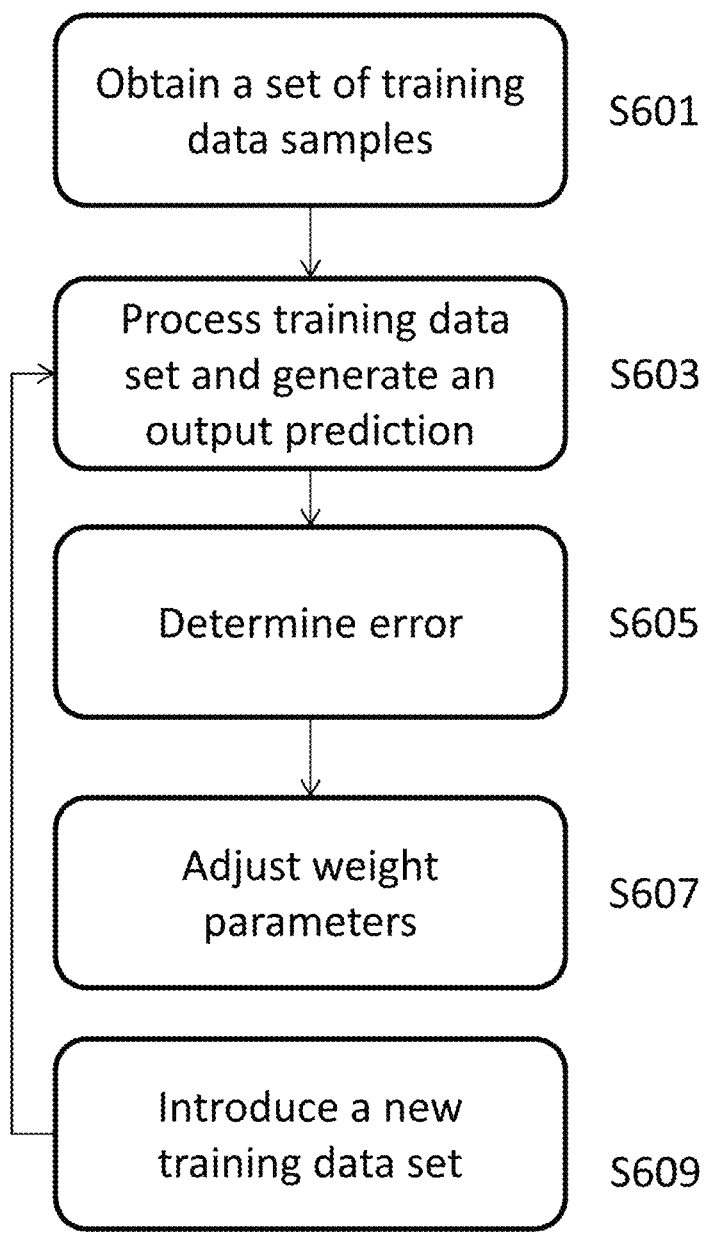
FIG. 6 is a flow diagram of an example training process of the neural network for object classification.

FIG. 6 illustrates a flowchart of an example process for training an object classification neural network, which can label objects shown in an input image. The neural network can be trained by processing many samples of training and, for every sample, adjusting the weight of each parameter in accordance with the error between the output generated by the neural network and a target output specified in the training sample. Once trained, the neural network can be deployed in a system, for example the neural network system of FIG. 2. The training procedure can be carried out by one or more computers.

In Step S601, the training system obtains a set of training data. Each data set comprises a training image and a target output. The input image is a representation of an image that shows one or more objects. For example, the image may include objects located in the vicinity of an autonomous or semi-autonomous vehicle. The training images represented by the training data set are different from one another and may or may not contain similar objects. The training data sets comprise a finite number of scenes, which can be used for training the neural network. In an embodiment, standard data augmentation techniques may be used to expand the number sample images. Augmentation techniques include but are not limited to random scale factor in the range 0.5 to 2, horizontal flip, varied hue, saturation, brightness and contrast.

The training target output of the training data sets represents the desired output of the object classification network which should be generated by the neural network. The target output is compared with the actual output of the neural network and the weighting parameters are adjusted so that the error between the target output and the generated output is reduced. In Step S603, the neural network processes a sample input image using the current values of the internal parameters and generates an output image.

In Step S605, the predicted output of the neural network is compared with the target output part of the training data set and the error in the prediction is estimated.

Consecutively, in Step S607 the weight of each internal parameter is adjusted so that the error between the predicted output and the target output is reduced to minimum.

In Step 609, the neural network is provided with a different set of training data and the training returns to step S603 in order to repeat the training procedure and adjust the internal parameters of the neural network so that a smaller error in the predicted output and the target output is achieved.

In an embodiment, the model is trained using cross-entropy loss and during training a weighted auxiliary loss is used at the end of the learning to downsample module and the global feature extraction module. Weighting the loss in this manner ensures that meaningful features for semantic segmentation are extracted by the learning to downsample module and the global feature extraction module and are learned independently from other sub parts of the network. In an embodiment, the weight of the auxiliary loss was set to 0.4. In an embodiment this is achieved by generating additional outputs after 407 and 427 (i.e. new softmax layers are introduced at this stage, forking out of the branches of the network). The output of the softmax layers is evaluated (task is also segmentation). The output of the three layers is used for updating weights. Softmax is used during training, since gradient decent is employed and it provides a probabilistic value between 0 and 1. During inference, the costly softmax computations are substituted with argmax, since both functions are monotonically increasing. Argmax just labels the data with 1 or 0 i.e. object exists or does not exist.

In an embodiment of the training process of the neural network, network pruning is implemented. In the initial stages of the training, the number of feature maps is doubled and training is conducted using the described above procedure. The number of parameter is decreased progressively to 1.75, 1.5, 1.25, and 1 times the original size, where the training procedure is repeated after each reduction of parameters. Network pruning effectively reduces the number of parameters in the network while preserving the same performance. This is achieved by removing features which are not used in the neural network architecture. Furthermore, network pruning allows for more efficient learning as only the required features are learned by the network.

Thus, pruning is usually used to reduce the parameters. However, in the embodiment described herein, since the number of parameters is acceptable, the pruning is performed to increase performance. Thus, the expressiveness of the network is doubles (double the number of parameters). Now the network is much slower since more filters exist (double the number). However, pruning is used to reach the original number of filters again. Here, pruning enlarges the number of filters (allows more), then selects the once which are good.

Figure 7:
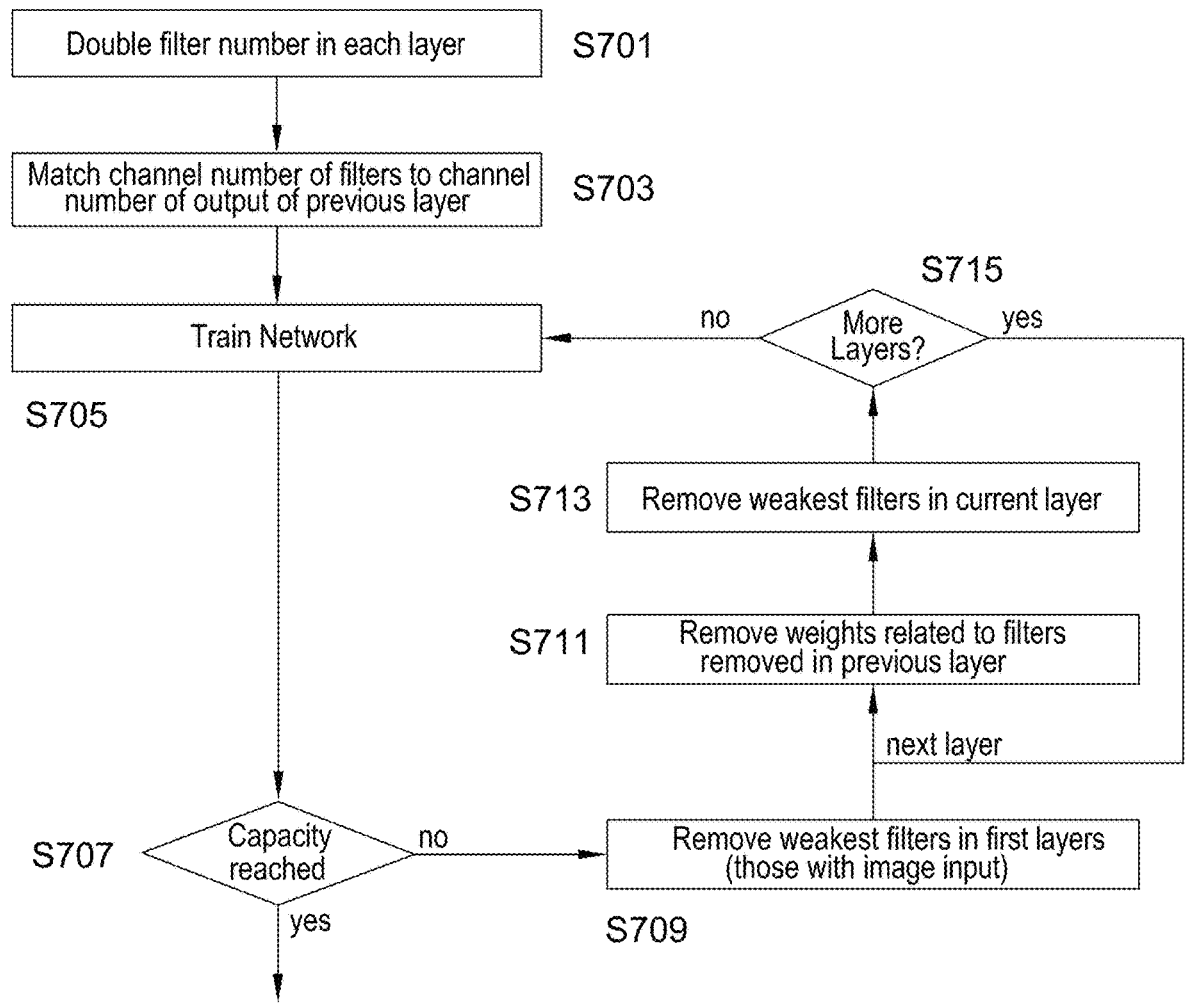
FIG. 7 is a flow diagram showing a parameter pruning process.
Figure 8:
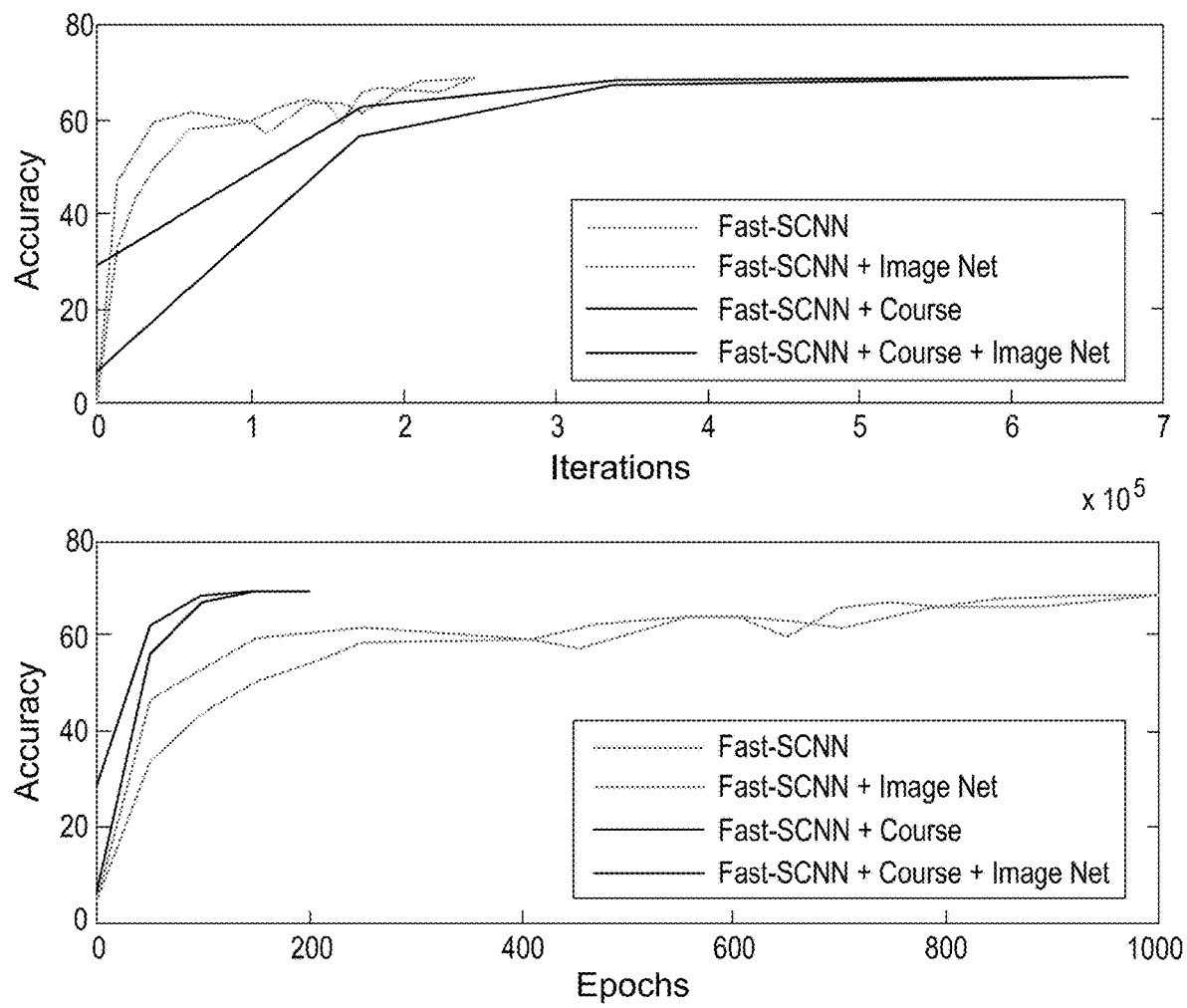
FIG. 8 is training curves on Cityscapes with accordance with an embodiment.

Thus, in this embodiment of the training process of the neural network, the number of filters is doubled at the start of the training procedure. How this is done will be described with reference to FIG. 7.

In step S701 the filter number for each layer is doubled. In step S703, the channel number of filters are matched to the channel number of the output of the previous layers. Say for example, each layer has an input size h×w and an output size h'×w'. All these layers have depth/channels related to the number of filters used. I.e. given h×w×c, c' filters of size 3×3 (for example) can be used to produce h'×w'×c'. If, as in step S701, the number of filters of the prior layer are double, then there are h×w×2c inputs, and 2c' filters of size 3×3×2c used.

In step S705, the network is trained as described in relation to FIG. 6. In step S707, it is determined if the capacity is reached, i.e. if the target number of filters has been reached.

In step S709, the weakest filters in the first layers (those with image input), are identified and removed. These filters may be identified many different metrics, in one embodiment the $\ell 1$ sum is used. For example, using the above dimensions, h×w×1.5c is now the input. The filters of the next layer are of size 3×3×2c, thus, in step S711, the weights that are related to the removed filters of previous layer are removed to get filters of size 3×3×1.5c. Then, in step S813, the weakest filters in the current layer are determined and the process is continued.

In step S715, it is checked to see if there are more layers which are affected by the removal of the filters in steps S711 and S713. If there are, the process loops back to step S711. Once all of the weakest filters and weights have been removed, the process returns to the training step S707. Once the network has been trained, it is then checked of the number of filters is to be reduced further (for example here, the number of filters are reduced from 2×, to 1.75× to 1.5× to 1.25× to 1×). If a further reduction is required, the process moves to step S709 to remove further filters. Otherwise the process finishes and the network is trained and pruned.

In an embodiment, batch normalisation is used after every layer of the learning to downsample module during training. Batch normalisation allows each layer of the neural network to learn more independently of the other layers. Batch normalisation scales the activations in the feature maps of the previous layer. As all activations throughout the neural network are in a given range there are no activations associated with too high or too low values. This allows for higher learning rates and improved feature learning.

In an embodiment, dropout of a set of neural network nodes is implemented before the soft-max layer. Dropout is a training approach which reduces the interdependent learning amongst the neurons in the network. During training a random set of nodes is dropped out of the network, so that a reduced version of the network is created. The reduced version of the network learns independently of other sections of the neural network and hence prevents neurons from developing co-dependency amongst one another.

To demonstrate the above an ablation study of the above was then made using the Cityscapes dataset [M. Cordts, M. Omran, S. Ramos, T. Rehfeld, M. Enzweiler, R. Benenson, U. Franke, S. Roth, and B. Schiele. The Cityscapes dataset for semantic urban scene understanding. In CVPR, 2016], and report its performance on the Ciryscape test set i.e. the Cityscapes benchmark server.

The experiments were performed on a workstation with Nvidia Titan X (Maxwell, 3072 CUDA cores) or NvidiaTitan Xp (Pascal, 3840 CUDA cores) with CUDA 9.0 and cuDNN V7. ReLU was used as nonlinearity function due to the faster training and the better accuracy achieved in comparison with ReLU6. During training, batch normalization is used at all layers and dropout is used before the soft-max layer only. During inference, parameters of batch normalization are merged with the weights and bias of parent layers. In the depth-wise convolution layers, we found that $\ell$2 regularization is not necessary. In an embodiment, for the other layers the $\ell$2 regularization is 0.00004.

Since labelled training data was limited, standard data augmentation techniques were applied in all experiments: random scale 0.5 to 2, horizontal flip, varied hue, saturation, brightness and contrast.

The models of Fast-SCNN are trained with TensorFlow machine learning platform using Python. Stochastic gradient decent (SGD) with momentum of 0.9 and batch-size 12 is used. Additionally, a poly learning rate was applied with base rate 0.045 and power 0.98. The maximum number of epochs is set to 1000, as no pre-training is used.

Cityscapes is a large-scale dataset for semantic segmentation that contains a diverse set of images in street scenes from 50 different cities in Germany. In total, it consists of 25,000 annotated 1024×2048 px images of which 5,000 have labels at high pixel accuracy and 20,000 are weakly annotated. In the experiments presented herein only 5,000 images were used with high label quality: a training set of 2,975 images, validation set of 500 images and 1,525 test images which can be evaluated on the Cityscapes evaluation server.

In an embodiment, pre-training with ImageNet was employed.

Cityscapes also provides 30 class labels, while only 19 classes are used for evaluation. Results are reported as mean intersection-over-union (mIoU) and runtime evaluation is performed in a single threaded CPU and a GPU to measure the forward inference time. For burn-in 100 frames are used and the average of 100 frames for the frame per second(fps) measurement are reported.

The overall performance of fast-SCNN is evaluated on the withheld test set of Cityscapes. In Table 6 are compared runtimes in fps at different resolutions for both Nvidia Titan X (Maxwell, 3072 CUDA) and Nvidia Titan Xp (Pascal, 3840 CUDA cores), represented by '*'. Two versions of fast-SCNN are shown: soft-max output (our prob) and object label output (our cls).

TABLE 6

|  | 1024 × 2048 | 512 × 1024 | 256 × 512 |
| --- | --- | --- | --- |
| Our prob | 47.5 | 149.4 | 310.7 |
| Our cls | 57.8 | 171.6 | 379.7 |
| Our prob* | 78.5 | 244.3 | 475.0 |
| Our cls* | 91.0 | 273.5 | 531.4 |

Class and category mIoU of Fast-SCNN using the Cityscapes test-set is presented in Table 7. Fast-SCNN achieves 68.0% mIoU. This model is designed for low memory embedded devices and uses only 1.1 million parameters. The results of Fast-SCNN are displayed in FIG. 9 for qualitative analysis. In the first column are the input RGB images, second column are the ground truth labels, and third column are the outputs of the Fast-SCNN.

TABLE 7

| Model | Class | Category | Params |
| --- | --- | --- | --- |
| Fast-SCNN | 68.0 | 84.7 | 01.11 |

TABLE 8

| Input size | Class | FPS |
| --- | --- | --- |
| 1024 × 2048 | 68.0 | 91.0 |
| 512 × 1024 | 62.8 | 273.5 |
| 256 × 512 | 51.9 | 531.4 |

As Fast-SCNN has specifically been design to have low capacity, the reasons being lower memory enables execution on embedded devices and better generalisation is expected. The performance of the proposed network has been evaluated with and without pre-training, and in connection with and without additional weakly labelled data. The results are presented in Table 9. For pre-training, the ImageNet database has been used and the feature fusion module is replaced by average pooling and the classification module comprises only a softmax layer. Pre-training on ImageNet frequently boosts accuracy and generality. The accuracy of Fast-SCNN with ImageNet pre-training yields 69.15% mIoU on the validation set of Cityscapes, while the Fast-SCNN achieves 68.62% mIoU without pre-training.

In addition, since the overlap between Cityscapes' urban roads and ImageNet's classification task is limited, it is reasonable to assume that Fast-SCNN may not benefit due to limited capability of both domains. Therefore, additional 20000 coarsely labelled images provided by Cityscapes has been incorporated, as they are from a similar domain. Nevertheless, Fast-SCNN trained with coarse training data (with or without ImageNet) performs similarly to each other, and with only slight improvement upon the original Fast-SCNN without pre-training.

It can be concluded that the low capacity Fast-SCNN does not benefit significantly from pre-training with Imagenet. Similar results can be achieved by using aggressive data augmentation and higher number of epochs.

TABLE 9

| Model | Class |
| --- | --- |
| Fast-SCNN | 68.62 |
| Fast-SCNN + ImageNet | 69.15 |
| Fast-SCNN + Coarse | 69.22 |
| Fast-SCNN + Coarse + ImageNET | 69.19 |

Figure 9:
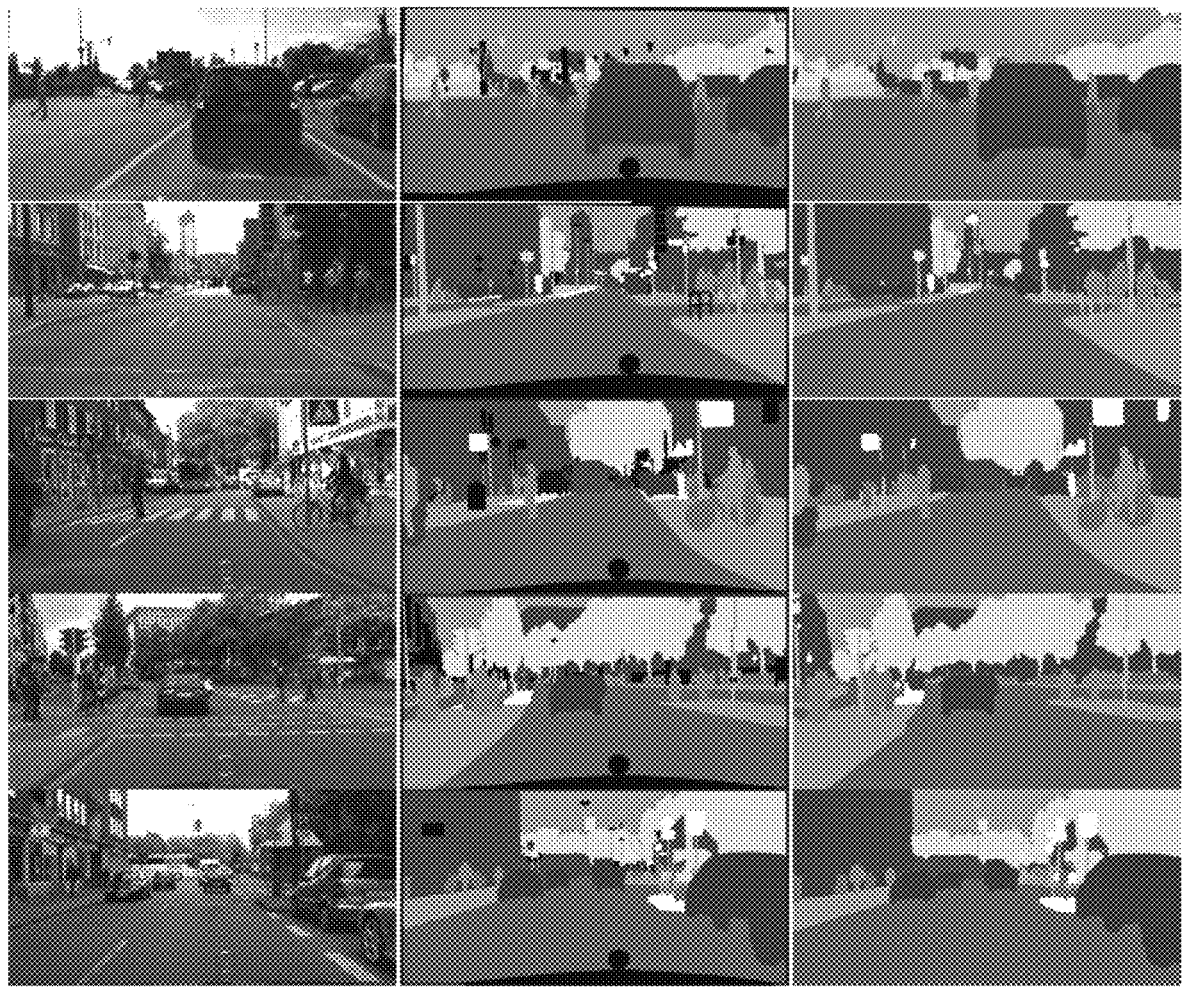
FIG. 9 is a visual comparison on Cityscapes validation set. First column: input RGB images; second column: ground truth labels; and last column: outputs of Fast-SCNN.

FIG. 9 shows the training curves. Fast-SCNN with coarse data trains slow in terms of iterations because of the weak label quality. Both ImageNet pre-trained versions perform better for early epochs (up to 400 epochs for training set alone, and 100 epochs when trained with the additional coarse labelled data). This means that when the Fast-SCNN model is trained from scratch it needs to be trained for longer in order to reach the similar accuracy.

Figure 10:
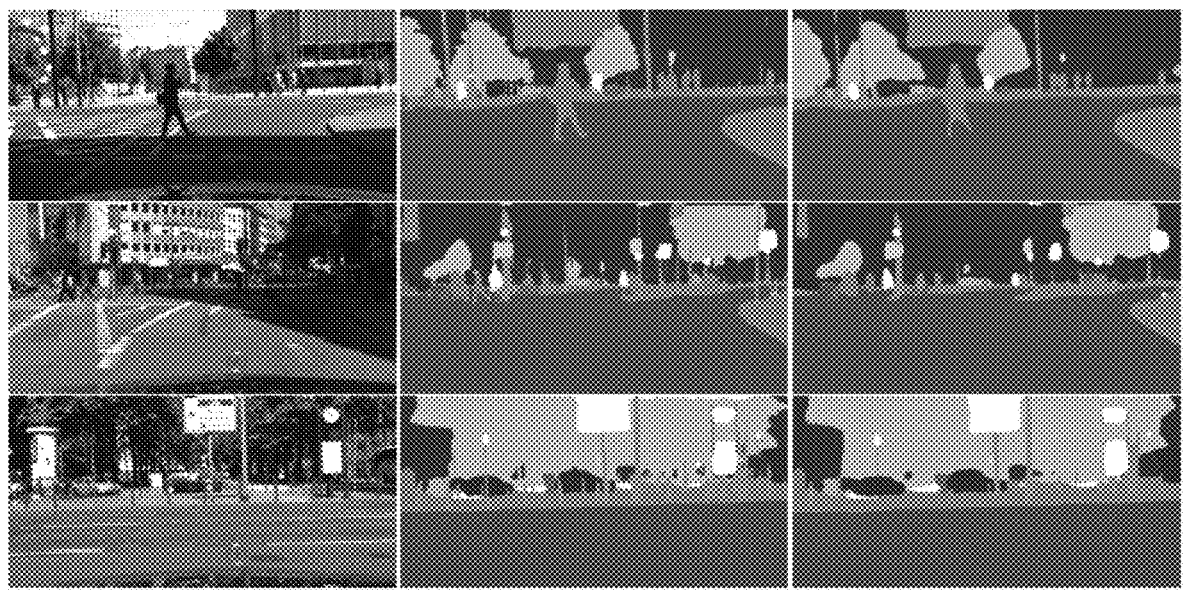
FIG. 10 is a visual comparison of the Fast-SCNN's segmentation results. First column: input RGB images; second column: outputs of Fast-SCNN; and last column: outputs of Fast-SCNN after zeroing-out the contribution of the skip connection.

The above embodiment relates to a network for faster than real-time object classification (91.0 fps) for high resolution images (1024×2048 px). Sharing the computational cost of the multi-branch network yields run-time efficiency. In the above architecture the skip connection proves beneficial for recovering spatial detail. The skip connection is especially beneficial around boundaries and objects of small size, FIG. 10.

Furthermore, the above study shows that if trained for long enough, large-scale pre-training of the model on an additional auxiliary task is not necessary for low capacity deep convolutional neural networks.

Figure 11:
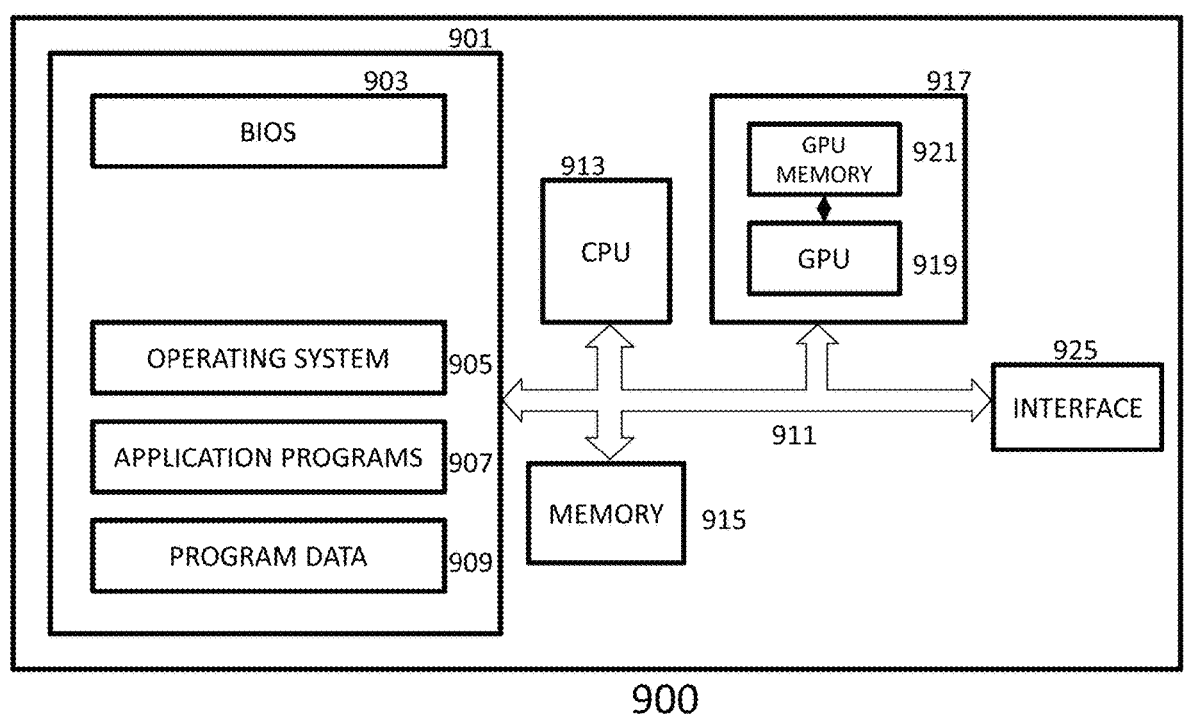
FIG. 11 is a schematic of a device that can be used in accordance with an embodiment.

FIG. 11 is a schematic of the hardware that can be used to implement methods in accordance with embodiments. It should be noted that this is just one example and other arrangements can be used.

The hardware comprises a computing section 900. In this particular example, the components of this section will be described together. However, it will be appreciated they are not necessarily co-located.

Components of the computing system 900 may include, but not limited to, a processing unit 913 (such as central processing unit, CPU), a system memory 901, a system bus 911 that couples various system components including the system memory 901 to the processing unit 913. The system bus 911 may be any of several types of bus structure including a memory bus or memory controller, a peripheral bus and a local bus using any of a variety of bus architecture etc. The computing section 900 also includes external memory 915 connected to the bus 911.

The system memory 901 includes computer storage media in the form of volatile/or non-volatile memory such as read-only memory. A basic input output system (BIOS) 903 containing the routines that help transfer information between the elements within the computer, such as during start-up is typically stored in system memory 901. In addition, the system memory contains the operating system 905, application programs 907 and program data 909 that are in use by the CPU 913.

Also, interface 925 is connected to the bus 911. The interface may be a network interface for the computer system to receive information from further devices. The interface may also be a user interface that allows a user to respond to certain commands et cetera.

In this example, a video interface 917 is provided. The video interface 917 comprises a graphics processing unit 919 which is connected to a graphics processing memory 921.

Graphics processing unit (GPU) 919 is particularly well suited to the above described method due to the operation of this multiple parallel calls. Therefore, in an embodiment, the processing may be divided between CPU 913 and GPU 919.

In one embodiment, the GPU is a NVIDIA Jetson TX2, which is a low power GPU chip.

In one embodiment, a dedicated computing device 900 is provided linked to each camera (see FIG. 1). The architecture described above in relation to FIGS. 2 to 4 avoids the need for floating point computation and therefore the computing device is well suited to low power locations such as combined with cameras on a vehicle.

The above described architecture also lends itself to mobile telephones using GPUs.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An image processing method for segmenting an image, the method comprising:
receiving an image;
processing said image with a common processing stage to produce a first feature map;
inputting said first feature map to a parallel processing stage, said parallel processing stage comprising first and second parallel branches that receive the first feature map; and
combining the output of the first and second branches at a fusion stage to produce a semantic segmented image, wherein the common processing stage comprises a neural network, the neural network having at least one separable convolution module configured to perform separable convolution and downsample the image to produce first feature map and said first branch comprises a neural network comprising at least one separable convolution module configured to perform separable convolution, and wherein said fusion stage comprises upsampling the output of the first branch and performing depthwise convolution on the upsampled output of the first branch prior to adding to the output of the second branch, wherein the adding comprises adding corresponding values of the upsampled output of the first branch and the second branch.

2. The image processing method according to claim 1, wherein second branch functions as a skip connection to allow the first feature map to be combined with the output of the first branch.

3. The image processing method according to claim 1, wherein the output from the first and second branches are combined at just one stage.

4. The image processing method according to claim 1, wherein the number of layers in the first branch is larger than the number of layers in the common processing stage.

5. The image processing method according to claim 1, wherein the output of the first and second processing stages are combined by adding.

6. The image processing method according to claim 1, wherein the depthwise convolution in the fusion stage is performed with a dilation factor that is greater than 1.

7. The image processing method according to claim 6, wherein upsampled output of the first branch has been subjected to depthwise convolution with a dilation factor that is greater than 1 and the output of the second branch are subjected to two dimensional convolution prior to adding.

8. The image processing method according to claim 1, wherein the combined output of the first and second branches are processed by a classifier.

9. The image processing method according to claim 1, wherein the separable convolution module in the first branch stage is depth-wise convolution module.

10. The image processing method according to claim 1, wherein the separable convolution module in the first branch is a depth-wise separable convolution module.

11. A non-transitory computer readable storage medium storing instructions configured to cause a computer to perform the method of claim 1.

12. An image processing method for segmenting an image, the method comprising: receiving an image; processing said image with a common processing stage to produce a first feature map; inputting said first feature map to a parallel processing stage, said parallel processing stage comprising first and second parallel branches that receive the first feature map; and combining the output of the first and second branches to produce a semantic segmented image, wherein the common processing stage comprises a neural network, the neural network having at least one separable convolution module configured to perform separable convolution and downsample the image to produce first feature map and said first branch comprises a neural network comprising at least one separable convolution module configured to perform separable convolution, wherein the separable convolution module in the first branch is bottleneck architecture module, wherein there are a plurality of bottleneck residual architecture modules.

13. The image processing method according to claim 12, wherein a pyramid pooling module is provided after the bottleneck architecture module.

14. A method of training a model, said model for semantic segmenting an image, the model comprising:
a common processing stage to produce a first feature map;
a parallel processing stage, said parallel processing stage comprising first and second parallel branches that receive the first feature map; and
combining the output of the first and second branches to produce a semantic segmented. image,
wherein the common processing stage comprises a neural network, the neural network having at least one separable convolution module configured to perform separable convolution and downsample the image to produce first feature map and said first branch comprises a neural network comprising at least one separable convolution module configured to perform separable convolution,
the training method comprising:
providing training data, the training data comprising image and semantic segmented information concerning said images; and
training said model using said images as the input and the semantic segmented information as the output, wherein two stages are trained together,
the method further comprising: adapting the model during training to add at east one additional output on a common processing stage and/or first processing branch stage,
the method further comprising training using the images as input and determining a loss by comparing with both the semantic segmented information at both the output and at the least one additional output and updating weights during training by using the determined losses from both outputs.

15. The method according to claim 14, further comprising adapting the number of filters during training, and reducing their number to discard filters of lower importance.

16. An image processing system for segmenting an image, the system comprising:
an interface and a processor,
said interface having an image input and being adapted to receive a first image,
said processor being adapted to;
process said image with a common processing stage to produce a first feature map;
input said first feature map to a parallel processing stage, said parallel processing stage comprising first and second parallel branches that receive the first feature map; and
combine the output of the first and second brandies at a fusion stage to produce a semantic segmented image,
wherein the common processing stage comprises a neural network, the neural network having at least one separable convolution module configured to perform separable convolution and downsample the image to produce first feature map and said first branch comprises a neural network comprising at least one separable convolution module configured to perform separable convolution, and wherein said fusion stage is configured to upsample the output of the first branch and perform depthwise convolution on the upsainpled output of the first branch prior to adding to the output of the second branch, wherein the adding comprises adding corresponding values of the upsampled output of the first branch and the second branch.

17. A detection system for a vehicle, said detection system, the detection system comprising the image processing system of claim 16, being adapted to receive an image and determine objects from said image by segmenting said image.

* * * * *